United States Patent [19]

Miyakawa et al.

[11] 4,443,090

[45] Apr. 17, 1984

[54] ELECTROMAGNETIC TRANSMITTING APPARATUS FOR A CAMERA

[75] Inventors: Hideaki Miyakawa; Yasuki Takahashi, both of Kanagawa; Fumio Hata, Tokyo, all of Japan

[73] Assignee: Canon Kabushiki Kaisha, Tokyo, Japan

[21] Appl. No.: 293,945

[22] Filed: Aug. 18, 1981

[30] Foreign Application Priority Data

Aug. 26, 1980 [JP] Japan ............................. 55-117367

[51] Int. Cl.³ .......................................... G03B 17/00
[52] U.S. Cl. .............................. 354/289.12; 354/76; 354/173.11; 354/465
[58] Field of Search ............. 354/60 R, 76, 145, 173, 354/234, 289

[56] References Cited

U.S. PATENT DOCUMENTS 4,015,198 3/1977 Iwashita et al. .................... 354/173
4,260,230 4/1981 Suzuki .................................. 354/76

Primary Examiner—Russell E. Adams
Attorney, Agent, or Firm—Toren, McGeady and Stanger

[57] ABSTRACT

An electromagnetic transmitting apparatus for a camera includes a first device at the main body of the camera to convert electric energy within the camera main body to magnetic energy, and a second device to receive the magnetic energy and convert it into electric energy. The second device is in a unit which can be mounted on the camera body, so that the electric energy at the camera main body is transmitted to the unit including the second device when the unit is mounted on the camera main body.

6 Claims, 7 Drawing Figures

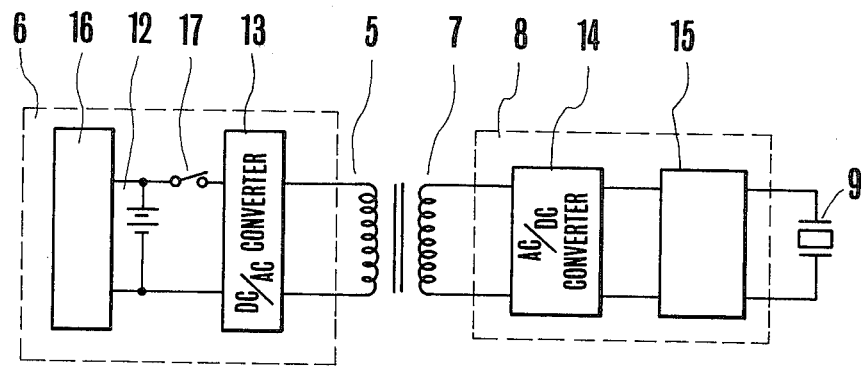
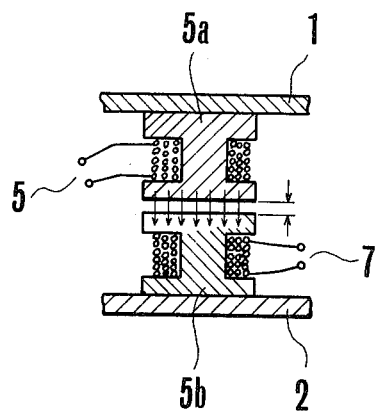
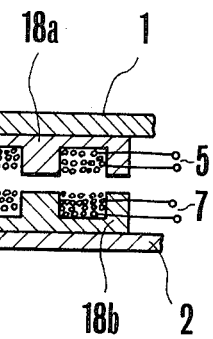
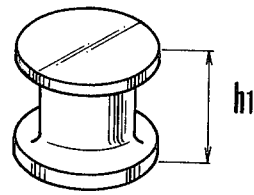
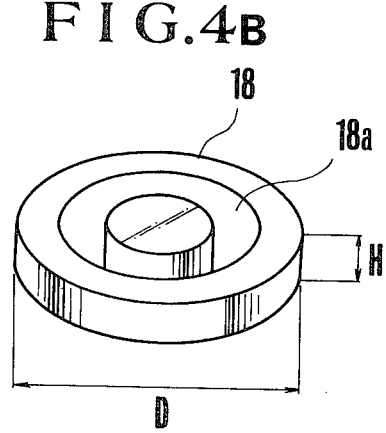

4,443,090

ELECTROMAGNETIC TRANSMITTING APPARATUS FOR A CAMERA

BACKGROUND OF THE INVENTION

Field of the Invention

Heretofore, a camera which has a data recording device or a sound making device, etc. built in at a back lid has been known. By doing this, for example when a self-timer action is to be indicated by a sound, the back lid may be used as a diaphragm or a resonant plate, thus providing an effect to enhance the sound. Also, if a sound emitting body is attached below a film pressing plate, space utilization efficiency can be greatly enhanced.

However, as a method to supply electric energy such as electrical signals to a unit housing an electrical circuit, or to supply electric energy for a driving circuit, a plurarity of electric contacts have been provided at both the camera side and the back lid side for transmitting and receiving electric energy by contacting one another, or the electrical circuit at the camera side and the electrical circuit at the back lid side are connected by wire leads.

But, for example, in a method to connect with contacts, not only is there a problem of improper connection but also the connection depends largely on the reliability of the contacts.

Also, when the connection is made by wire leads, a breaking of wire by opening and closing of the back lid, power source short-circuiting by breaking of insulation of the wire leads, etc. could take place.

Also, such a problem similarly takes place in a flash light device either of and a motor drive device which can be attached to and detached from the camera main body.

Because of the above problem, since it has been particularly difficult to transmit driving energy to a circuit within such a unit member as mentioned above, a flash light device or a motor drive device which can be mounted on and detached from the camera, or a data recording circuit built in a back lid, each have a power source built therein, virtually without exception.

SUMMARY OF THE INVENTION

It is an object of the present invention to provide an electric energy transmission device for an accessory, or a unit member, which can be mounted on or detached from, or opened and closed relative to a camera main body.

Another object of the present invention is to provide a signal transmission apparatus which transmits an exposure information signal and an actuating signal, or a warning signal, from within a camera main body to the accessory or unit member without the use of contacts.

A further object of the present invention is to provide means which can enhance the transmission efficiency of electrical energy or information signals in the above-mentioned electric energy transmission device, or in a signal transmission device between a camera and an accessory.

BRIEF DESCRIPTION OF THE DRAWINGS

FIG. 2 is an electrical circuit block diagram.

FIG. 3A is a cross sectional view of an important part of a magnetic circuit. FIG. 3B is an oblique view of a core.

FIG. 4A is a cross sectional view of an important part of an improved example of a magnetic circuit. FIG. 4B is an oblique view of a core.

DETAILED DESCRIPTION OF THE INVENTION

The present invention solves the above-mentioned problems, and makes possible a supply or transmission of driving electric energy, or electric energy as signals, from a camera main body to a unit member which can be mounted to said camera main body with no wiring and no contacts.

Now, detailed explanations of the present invention shall be made based on the accompanying drawings.

Figure 1:
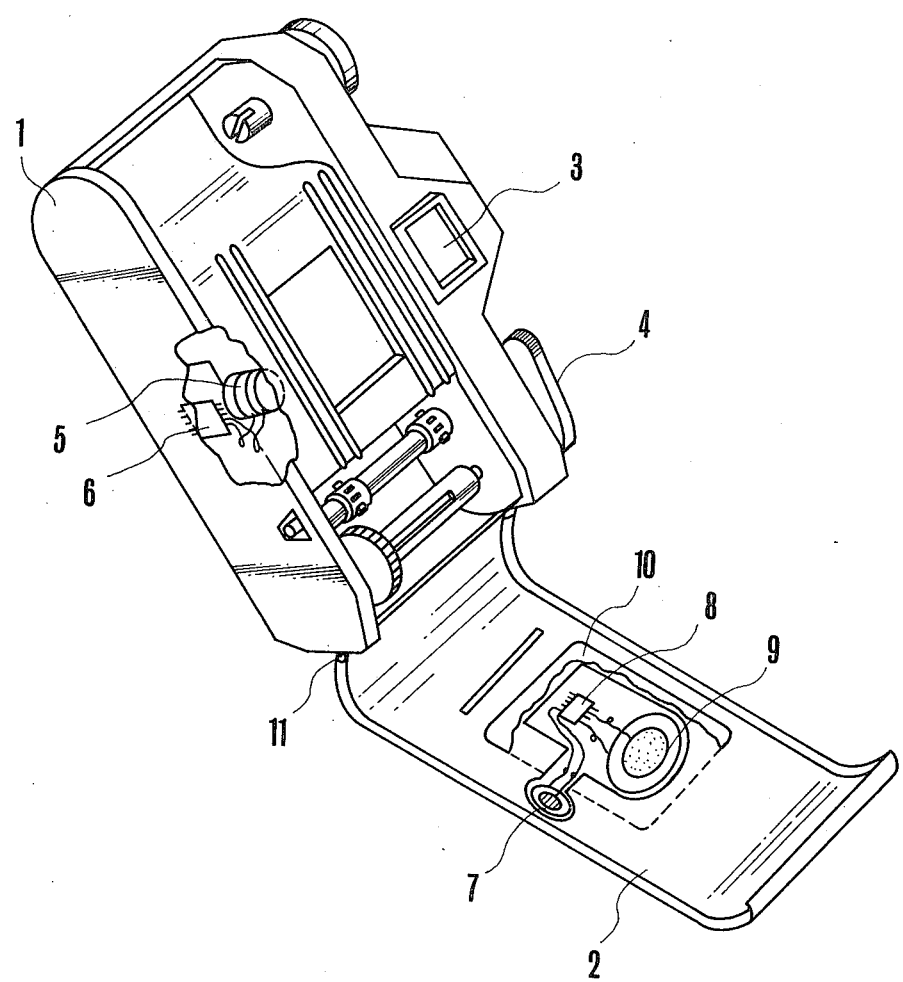
FIG. 1 shows an example in which the present invention is used for transmission of electric energy between a camera main body and a back lid.

FIG. 1 is an oblique view to show an example which has an arrangement that electric energy is transmitted from a camera main body side to a sound emitting body for a self-timer built in a back lid.

Shown in the drawing, are a camera main body 1 and a back lid 2 axially supported, by a shaft 11, to said camera main body in a rotatable manner. Here, while in this example the back lid 2 is made for an opening and closing action by rotatingly shifting its position against the camera main body 1, the back lid may be so made as to be attached to and detached from the camera main body. Also shown are a view finder window 3, and a wind up crank lever 4. A coil member 5 according to the present invention converts electric energy from an electric circuit 6 within the camera to magnetic energy. A coil 7 generates electromagnetic induction by said magnetic energy for generating electric energy. This coil 7 is placed at a position to receive the strongest magnetic field from the coil 5 when the back lid 2 is closed, that is when the back lid 2 is, set against the camera body 1.

Of course, even when the back lid 2 is made to be attached to and detached from the camera main body, an arrangement is so made that the magnetic field by the coil 5 works most strongly against the coil 7 when the back lid is attached to the camera main body.

Now, while the positions of the coil 5 and the coil 7 are separated on the shaft 11 in the drawing, for example if such arrangement is made that the coil 5 is built in a part of the shaft 11 which includes a ferrite core, and the coil 7 is provided at another part of the shaft 11, receiving and a transmission of electric energy can be made possible at any time only by attaching the back lid to the camera. The present invention includes such arrangement. A driving circuit 8 is connected to the coil 7, and a sound emitting body 9 is connected to said driving circuit. Also shown is a film pressing plate 10, and the circuit 8 and the sound emitting body 9, etc. are provided in a space between the pressing plate 10 and the back lid 2.

FIG. 2 is a block diagram of the circuit shown in FIG. 1. In the drawing, components identified with the same numbers show the same components, thus explanations thereof are omitted. A power source battery 12 is built in the camera main body, and a DC/AC converter 13 is connected to said battery and converts the direct current from the battery to alternating current and supplies the same the coil 5. An electric circuit 16 is provided within the camera main body and is driven by the battery 12, for example a photo-sensing circuit. An AC/DC converter 14 converts an alternating current induced at the coil 7 by the magnetic flux of the coil 5 to a direct current. A driving circuit 15 drives the above-mentioned sound emitting body 9 and has for example an oscillating circuit, etc. built therein. A normally opened switch 17 is closed along with starting of actuation of a self-timer circuit not shown in the drawing.

While this example is for transmitting driving energy to a circuit at the back lid side from the camera side, the present invention can be applied as a matter of course to a case in which information signals from the camera side are transmitted to a unit member which can be mounted to and dismounted from, or made rotatable against the camera main body. Such arrangement may achieve the function that signals are further overlapped on the alternating current impressed on the coil 5 of FIG. 2 as an example, and the induced current from the coil 7 is demodulated.

FIG. 3A shows a cross sectional view in which magnetic circuits made by winding the coils 5, 7 around cores 5a, 5b made of ferrite material are placed at suitable positions at the camera side and at the back lid side. FIG. 3B is an oblique view of the core 5a, 5b.

When power is supplied to the coil 5 at the camera side, magnetic force in a direction shown by an arrow is generated from the core 5a to the core 5b by an electromagnetic induction function. By this, induced electromotive force is generated between both ends of the coil 7 as the magnetic circuit 7, 5b at the back lid side receives said magnetic force. The converter 14 and the driving circuit 15 shown in FIG. 2 are actuated by the induced electromotive force generated at this coil to make the sound emitting body 9 emit sound.

When the sound emitting body 9 is provided at an accessory or at the back lid side, and as an exposure signal of the camera falls outside of an appropriate range, a signal for improper exposure is emitted from exposure operation means including a photo-sensing circuit of FIG. 2, and power is supplied to the coil 5 through prescribed voltage generating means, not shown in the drawing, based on said signal. By this, magnetic force is generated at the magnetic circuit at the camera side, and the sound emitting body 9 emits sounds by the induced electromotive force generated at the coil of the magnetic circuit, at the accessory or the back lid side.

The above-mentioned arrangement operates to transmit improper exposure information computed by the exposure operation means at the camera side, to the accessory or the back lid for giving a warning signal to a person being photographed, or to a photographer, by the sound information.

The transmitting efficiency may be enhanced if the separating distance λ between opposite faces of the cores 5a, 5b at the camera side and at the back lid side in the arrangement of FIG. 3 is as short as possible.

FIGS. 4A,4B show another example of each of the magnetic circuits shown in FIGS. 3A,3B. Cores having H-shape cross sections as shown in FIGS. 3A,3B have a height $h_1$ such that when one of the cores is positioned inside of a back lid of a camera, bulging will occur at the inside of the back lid, which is not desirable.

FIGS. 4A,4B show an improved example in which the cross section of the core is made in E-shape, which can reduce a height H of a core 18 by flattening the same, thus reducing the total height (thickness) of the circuit. Further, in the case of the example shown in FIG. 4, by making a cross sectional shape of the core to E-shape, a path of magnetic flux can be made as a closed loop to further enhance the transmission efficiency.

Figure 5:
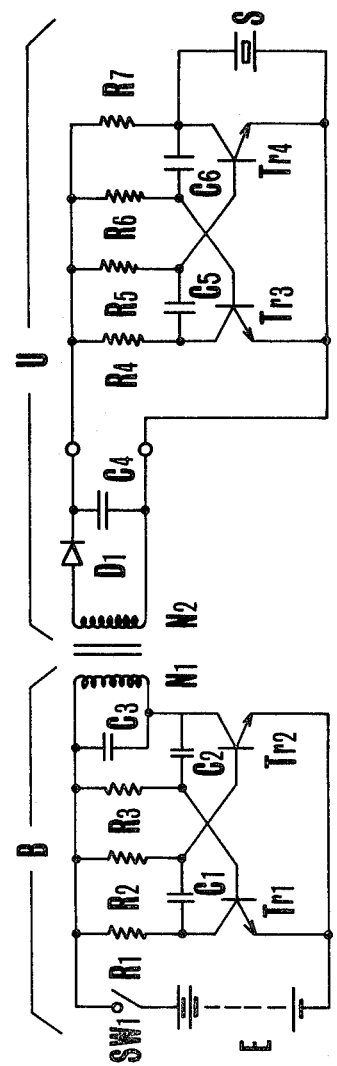
FIG. 5 shows an example of a circuit in another example.

FIG. 5 shows another example of the present invention, in which a mark B represents a camera side while a mark U represents an accessory side. In this circuit diagram, E is a power source at the camera side or a battery box to be attached to a camera. $SW_1$ shows a switch, and $R_1$ to $R_3 \cdot C_1 \cdot C_2 \cdot Tr_1 \cdot Tr_2$ represent an oscillation circuit, while a capacitor $C_3$ represents a rectification circuit. At the accessory side, $D_1 \cdot C_4$ represent a rectification circuit, and $R_4$ to $R_7 \cdot C_5 \cdot C_6 \cdot Tr_3 \cdot Tr_4$ represent an oscillation circuit for a sound emitting body S.

An arrangement shown in FIG. 5 can be used for various warning indicating functions. For example, the switch $SW_1$ is used as a film detection switch so that by making $SW_1$ closed when a film of the camera has been broken, or a film take up stroke of a take up spool becomes larger than a prescribed value, an oscillation circuit at the camera side is actuated, causing a sound emitting body at the accessory side to emit sound.

As has been explained in detail, the present invention provides a transmission and a receiving of electric energy between a unit member which can be attached to and detached from or rotated against a camera main body, and said camera main body by using magnetic transmission means. Unnecessary exposure of wiring or special contact structure can be omitted when said unit is attached to the camera main body, yet the invention is advantageous in securing reliability.

What is claimed is:

1. An apparatus to transmit electric power between a photo-taking device and an accessory associated with the device, comprising:
   (a) a main body forming a part of the photo-taking device;
   (b) electric power supplying means provided within said main body, said electric power supplying means including first conversion means to convert electric power from a power source associated with said electric power supplying means into a magnetic signal by electromagnetic induction; and
   (c) electric power receiving means provided within the accessory, said electric power receiving means including second conversion means to convert the magnetic signal from said electric power supplying means to an electric signal when said first and said second conversion means are in magnetic coupling relation with one another.

2. An electric power supplying apparatus for transmitting power between a camera main body and a back lid thereof, comprising:
   first conversion means to convert electrical signals produced within the camera main body into magnetic signals,
   and second conversion means provided at the back lid to convert the magnetic signals from said first conversion means into electric signals,
   wherein a transmission of the magnetic signals is made between said first conversion means and said second conversion means when the back lid is closed for transmitting electric power between the camera main body and the back lid in the absence of contact between said first and said second conversion means.

3. A signal transmission apparatus for transmitting signals between a camera main body and a back lid thereof, comprising:
- first conversion means to convert a selected one of an exposure information signal, an operation actuating signal and a warning signal produced within the camera main body into a magnetic signal, and
- second conversion means provided at the back lid to convert the magnetic signal from said first conversion means into an electric signal,
- so that a transmission of various signals from the camera side is made to the back lid side in the absence of contact between said first and said second conversion means.

4. An apparatus according to claim 1, 2 or 3, which further comprises a first magnetic circuit forming a part of said first conversion means to convert electric signals produced at the photo-taking device or camera side into magnetic signals, and a second magnetic circuit forming a part of said second conversion means to receive the magnetic signals from said first magnetic circuit and to generate corresponding electric signals.

5. An apparatus according to claim 4, in which said first and second magnetic circuits include cores made of magnetic material and coils wound around said cores, so that said cores can be operatively placed in closely opposing relation to form a closed loop magnetic circuit.

6. An apparatus according to claim 5, in which the accessory or the back lid includes a sound emitting body for emitting sound in response to the signals from said second magnetic circuit.

* * * * *